(No Model.)
J. H. BOOTH & S. W. BEARD.
DEVICE FOR PREVENTING ANIMALS FROM JUMPING FENCES.
No. 376,065. Patented Jan. 10, 1888.
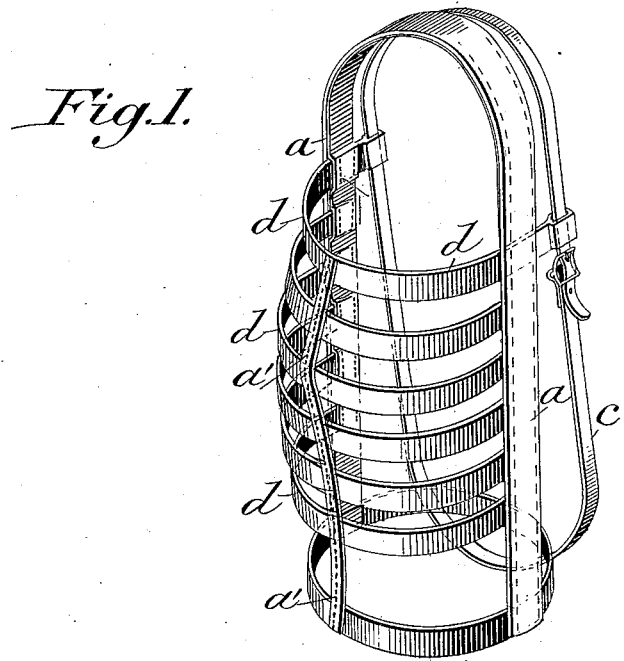
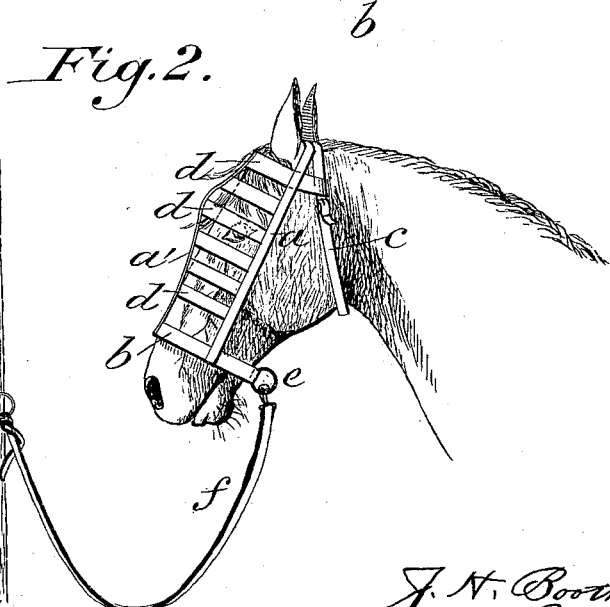

UNITED STATES PATENT OFFICE.

JOHN H. BOOTH AND SYLVANUS W. BEARD, OF PROVIDENCE, KENTUCKY.

DEVICE FOR PREVENTING ANIMALS FROM JUMPING FENCES.

SPECIFICATION forming part of Letters Patent No. 376,065, dated January 10, 1888.

Application filed October 7, 1887. Serial No. 251,721. (No model.)

*To all whom it may concern:*

Be it known that we, JOHN H. BOOTH and SYLVANUS W. BEARD, citizens of the United States, residing at Providence, in the county of Webster and State of Kentucky, have invented certain new and useful Improvements in Devices for Preventing Animals from Jumping Fences; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a device to be employed for the purpose of preventing horses and mules from jumping fences, and may be called a "breach-fender," as it prevents the animals from either jumping or breaking the fences. It does not in any way interfere with their grazing; but upon approaching a fence and raising the head every elevation of the same seems to add to its height, and thus discourages them from making the attempt to jump it.

In constructing this device we make a headstall of leather in form similar to that of a common halter. In fact, by the addition of a ring and strap to the nose-piece it may be used as such. Across the front of this headstall, from the nose-piece to the upper part above the eyes of the animal, is placed a series of bars at a short distance from each other, said bars being bowed out so as to project some distance in front of the face, so that the cross-bars will be an inch or two away from and in front of the animal's eyes. Experience has demonstrated that so far as the animal is concerned the optical illusion is perfect, as they mistake the cross-bars of the headstall for the rails of the fence of such height that they do not attempt to jump it.

In the accompanying drawings, which illustrate this invention, and in which similar letters of reference indicate like parts in the different figures, Figure 1 is a perspective view of the device, and Fig. 2 is a similar view showing how it may be adapted for use as a halter.

In the drawings, $a\,a$ represent the side straps of the headstalls; $b$, the nose-piece, and $c$ the throat-latch. All of these parts are like those in common use for halters. Across the front of this headstall, extending from one side strap to the other, is a series of bars, $d$, preferably of leather, although they may be made of other material, if preferred. These bars are secured at each end to one of the side straps, and are stiffened and the spacing between them preserved by the central strap, $a'$, secured to the nose-piece $b$ at its lower end and to each of the bars in succession to and including the upper. If preferred, this strap $a'$ may be made of metal secured to the bars by a rivet; but if it be of leather it may be continued upward and attached to the side straps on top of the head, so as to pass between the ears of the animal, thus preventing the sagging of the bars, as they would be supported at their mid-length by said strap $a'$ from above, as well as by the nose-piece below.

In order to fit this device for use as a halter, a ring, $e$, is attached to the nose-piece, as shown in Fig. 2, to which a strap, $f$, may be attached by means of a snap-hook or buckle, thus allowing the device to serve the double purpose of a breach-fender and halter.

Having thus described our invention, we claim as new, and desire to secure by Letters Patent, the following:

As an improvement in devices for preventing animals from jumping fences, the headstall composed of side straps, $a\,a$, throat-latch $c$, and nose-piece $b$, in combination with the bars $d\,d$ and supporting-strap $a'$, all arranged substantially as and for the purpose set forth.

In testimony whereof we affix our signatures in presence of two witnesses.

JOHN H. BOOTH.
SYLVANUS W. BEARD.

Witnesses:
J. H. TAYLOR,
W. T. MONTGOMERY.